(12) United States Patent
Yoshioka et al.

(10) Patent No.: US 8,899,765 B2
(45) Date of Patent: Dec. 2, 2014

(54) STROBOSCOPIC DEVICE

(75) Inventors: Hiroyuki Yoshioka, Osaka (JP);
Katsunori Kawabata, Kyoto (JP)

(73) Assignee: Panasonic Corporation, Osaka (JP)

( * ) Notice: Subject to any disclaimer, the term of this patent is extended or adjusted under 35 U.S.C. 154(b) by 222 days.

(21) Appl. No.: 13/514,115

(22) PCT Filed: Dec. 3, 2010

(86) PCT No.: PCT/JP2010/007049
§ 371 (c)(1),
(2), (4) Date: Jun. 6, 2012

(87) PCT Pub. No.: WO2011/070752
PCT Pub. Date: Jun. 16, 2011

(65) Prior Publication Data
US 2012/0243201 A1    Sep. 27, 2012

(30) Foreign Application Priority Data

Dec. 11, 2009    (JP) ................................. 2009-281273

(51) Int. Cl.
*G03B 15/05*    (2006.01)
*G03B 15/03*    (2006.01)

(52) U.S. Cl.
CPC ........ *G03B 15/03* (2013.01); *G03B 2215/0528* (2013.01); *G03B 15/05* (2013.01)
USPC .................................. 362/16; 362/17; 362/18

(58) Field of Classification Search
CPC .................. G03B 15/05; G03B 15/03; G03B 2215/0592; G03B 2215/0528; F21V 14/06

USPC ....................................................... 362/16–18
See application file for complete search history.

(56) References Cited

U.S. PATENT DOCUMENTS

| 4,948,210 A | * | 8/1990 | Simms ......................... 359/356 |
| 5,813,743 A | * | 9/1998 | Naka .............................. 362/16 |
| 5,878,291 A | * | 3/1999 | Hagiuda et al. ............... 396/175 |
| 6,011,929 A | | 1/2000 | Fuke et al. |
| 2001/0028559 A1 | | 10/2001 | Tenmyo |

(Continued)

FOREIGN PATENT DOCUMENTS

| CN | 1177122 A | 3/1998 |
| CN | 1385751 A | 12/2002 |

(Continued)

OTHER PUBLICATIONS

International Application Serial No. PCT/JP2010/007049, International Search Report mailed Dec. 28, 2010, 4 pgs.

(Continued)

*Primary Examiner* — William Carter
(74) *Attorney, Agent, or Firm* — RatnerPrestia (57) ABSTRACT

A stroboscopic device includes a light emitter disposed in a light-emitter casing, a light controller member disposed in an opening of the light-emitter casing, and a prism member disposed at a position near the light emitter where an opening of a reflector is not covered. The light emitter includes a flash discharge tube and a reflector for reflecting the light rays from the flash discharge tube in an irradiation direction. The light controller member controls the light rays from the light emitter. The prism member bends the light rays emitted from the flash discharge tube into an optical axis direction.

12 Claims, 6 Drawing Sheets

(56) References Cited

U.S. PATENT DOCUMENTS

| | | |
|---|---|---|
| 2002/0080614 A1 | 6/2002 | Terada |
| 2002/0186972 A1 | 12/2002 | Tenmyo |
| 2003/0156414 A1 | 8/2003 | Tenmyo |
| 2004/0170008 A1 | 9/2004 | Tenmyo |
| 2004/0189168 A1* | 9/2004 | Tenmyo .................. 313/113 |
| 2006/0171165 A1 | 8/2006 | Tenmyo |

FOREIGN PATENT DOCUMENTS

| | | |
|---|---|---|
| CN | 1815342 A | 8/2006 |
| CN | 1306335 C | 3/2007 |
| JP | 61138242 A | 6/1986 |
| JP | 3661798 B2 | 10/1996 |
| JP | 09138449 A | 5/1997 |
| JP | 2001264859 A | 9/2001 |
| JP | 2002-148687 A | 5/2002 |
| JP | 2002-148688 A | 5/2002 |
| JP | 2007065427 A | 3/2007 |

OTHER PUBLICATIONS

Chinese Search Report for Application No. 201080055521.7 dated Apr. 4, 2014.

* cited by examiner

STROBOSCOPIC DEVICE

This Application is a U.S. National Phase Application of PCT International Application No. PCT/JP2010/007049.

TECHNICAL FIELD

The present invention relates to stroboscopic devices used as auxiliary light source for photography.

BACKGROUND ART

Figure 5A:
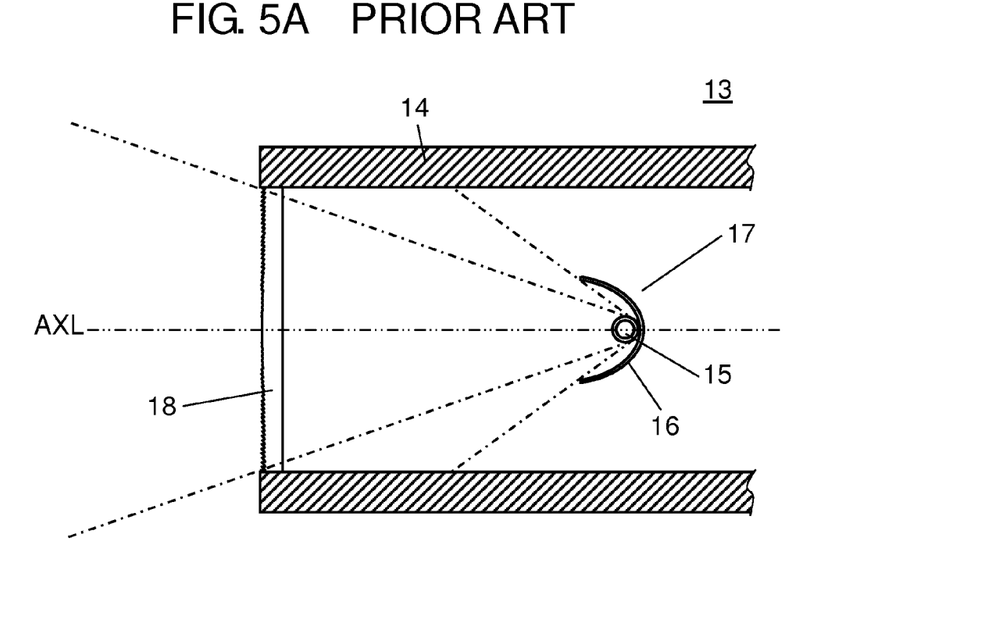
FIG. 5A is a sectional view of a key part illustrating a flash coverage of irradiated light rays when a conventional stroboscopic device is at the telephoto end.
Figure 5B:
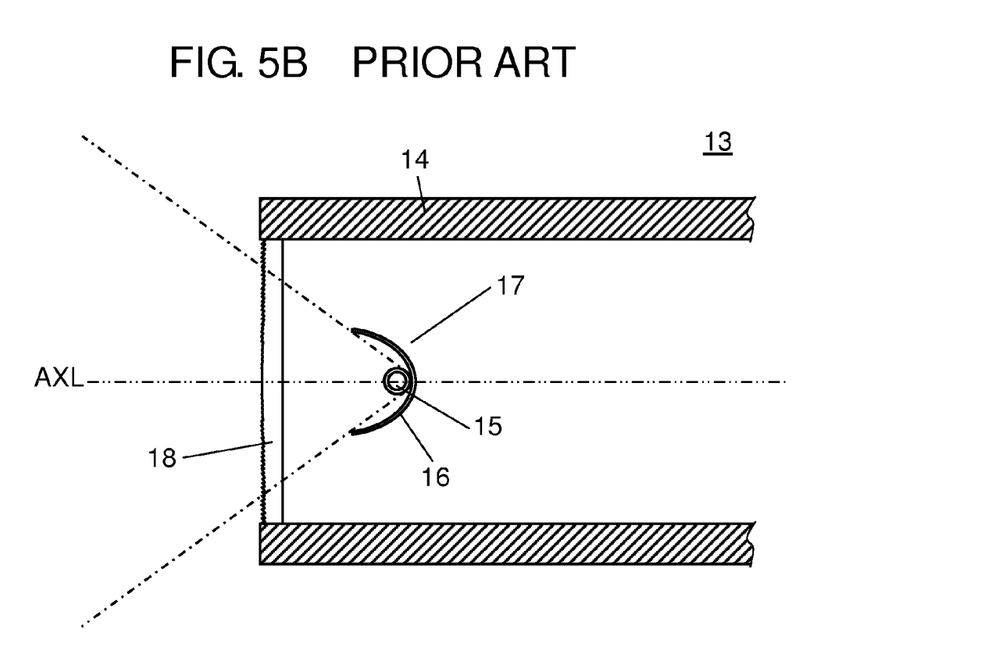
FIG. 5B is a sectional view of a key part illustrating a flash coverage of irradiated light rays when the conventional stroboscopic device is at the wide-angle end.

Conventionally, as shown in FIGS. 5A and 5B, stroboscopic device 13 proposes to change an irradiation angle of a light ray by varying a distance between light controller member 18 and light source 15 in order to correspond to a change in shooting range (lens zooming). This stroboscopic device includes light emitter 17 disposed in light-emitter casing 14 and light controller member 18 disposed in an opening of light-emitter casing 14 for controlling the light ray from light emitter 17. Light emitter 17 includes light source 15 and reflector 16 that reflects the light rays (light flux) from light source 15 in an irradiation direction (left hand when looking at the drawing from the surface).

FIGS. 5A and 5B are vertical sectional view of light-emitter casing 14 of stroboscopic device 13. FIG. 5A shows the position of light-emitter 17 at a telephoto end. A flash coverage of stroboscopic device 13 in this position is indicated by the chain line. FIG. 5B shows the position of light-emitter 17 at a wide-angle end. A flash coverage of stroboscopic device 13 is indicated by the chain line.

This type of stroboscopic device 13 may have a broadened irradiation angle to meet the use of ultra-wide lens. However, there are the light rays (see the chain line in FIG. 5A) that do not enter light controller member 18 provided in the opening of light-emitter casing 14 when light controller member 18 is at a point distant from light source 15. This results in a loss of light.

To prevent such loss of light, a conventional stroboscopic device (illumination optics) disclosed in PTL 1 includes a light source (xenon tube), a reflective member (reflector) reflecting the light ray from the light source toward the light controller member (Fresnel lens), and a reflective plate extending between an end of the reflective member at the telephoto end and an end of light controller member, whose inner circumferential face is a reflective face. The stroboscopic device configured in this way reflects the light rays that do not enter the light controller member at the reflective face of the reflective plate to make the light ray enter the light controller member. (For example, see paragraph [0020] to [0026] of PTL 1.)

A conventional stroboscopic device (lighting device with variable irradiation angle) disclosed in PTL 2 includes a light source (flash discharge tube), a reflective member (reflector) for reflecting the light rays from the light source to a light controller member, a first translucent optical member that divides the light rays from the light source into multiple light paths, and a second translucent optical member with multiple cylindrical lens faces for converting the light rays from the first translucent optical member to an intended light distribution characteristic. The stroboscopic device as configured above controls the light rays from the light source by changing a distance between an outgoing face of the first translucent optical member and the incoming face of the second translucent optical member. The light rays are refracted at an intended irradiation angle at each of multiple cylindrical lens faces of the second translucent optical member, and enters the light controller member (for example, see paragraph [0024] to of PTL2).

However, in the conventional stroboscopic device disclosed in PTL1, uneven irradiation may occur if the light reflects at a joint of the reflective member and the reflective plate at an unexpected angle. In addition, a movable mechanism of the reflective member makes the structure complicated.

In the conventional stroboscopic device disclosed in PTL2, the irradiation angle is broadened by crossing the light rays from the light source by means of the light-collecting effect of the first translucent optical member and the light-collecting effect of the second translucent optical member. However, to satisfy a demand for further wider irradiation angle, the refractive power of the first and second translucent optical members need to be further increased.

More specifically, the conventional stroboscopic device disclosed in PTL2 refracts the light rays by curvature of the outgoing face of the second translucent optical member so as to mutually cross the light rays to widen the irradiation angle.

However, if the refractive power of the second translucent optical member is increased to achieve further wider irradiation angle, the light rays cross at the telephoto end, due to excessive refractive power of the second translucent optical member. This risks inability to collect light at an optimal irradiation angle at the telephoto end.

CITATION LIST

Patent Literature

PTL 1 Japanese Patent Unexamined Publication No. H9-138449

PTL 2 Japanese Patent Unexamined Publication No. 2001-264859

SUMMARY OF THE INVENTION

A stroboscopic device of the present invention includes a light emitter disposed in a casing and configured with a light source and a reflector for reflecting the light rays from the light source, and a light controller member disposed in an opening of the casing for controlling the light rays from the light emitter. In the stroboscopic device that adapts for changing an irradiation angle by varying a distance between the light controller member and the light source, a prism member is disposed near the light emitter at a position where the prism member does not cover an opening of the reflector. The prism member bends the light rays from the light source into an optical axis direction.

With this configuration, the light rays that are not directly irradiated or directly irradiated via the reflector from the light source to the light controller member (if not via the prism member) but emitted to inside the casing can be guided to the light controller member by the refractive power of the prism member. Accordingly, the guided the light rays can be controlled to complement the light rays directly irradiated or directly irradiated via the reflector. Light rays can thus be used more efficiently by using the light rays not irradiated to the light controller member but emitted to inside the casing. Reduction of light at the telephoto end can be suppressed even if the refractive index of the light controller member is reduced to achieve a wider irradiation angle.

DESCRIPTION OF EMBODIMENTS

An exemplary embodiment of the present invention is described below with reference to drawings.

Figure 1A:
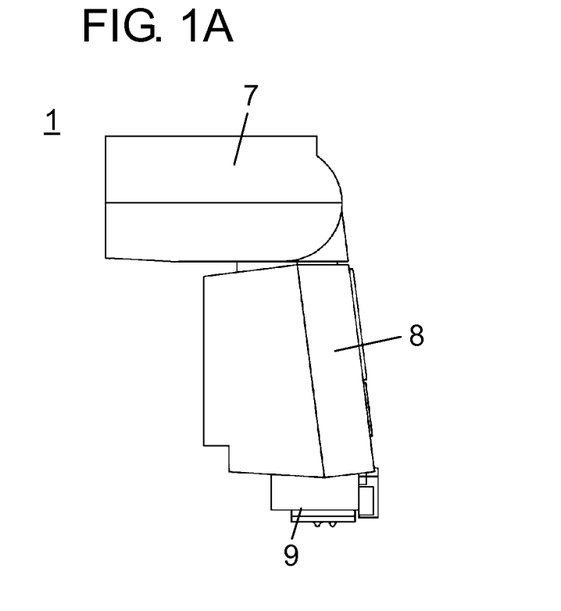
FIG. 1A is a schematic side view of a stroboscopic device in accordance with an exemplary embodiment of the present invention.
Figure 1B:
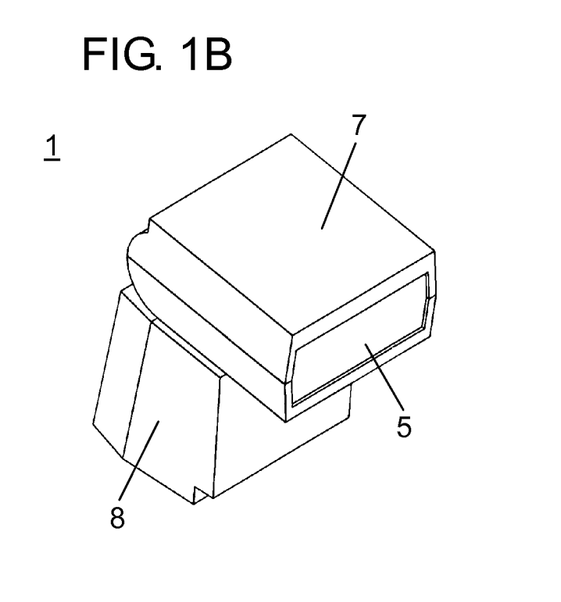
FIG. 1B is a schematic perspective view of the stroboscopic device in accordance with the exemplary embodiment of the present invention.
Figure 2:
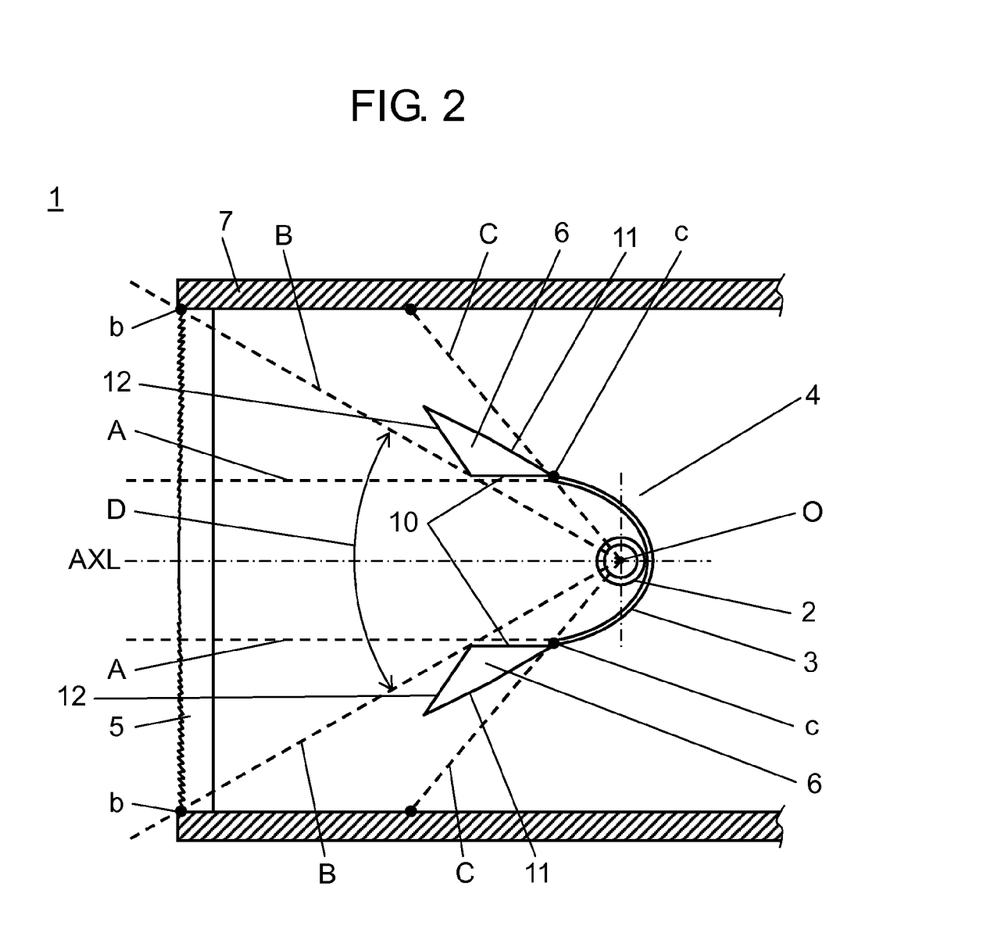
FIG. 2 is a sectional view of a key part of the stroboscopic device in accordance with the exemplary embodiment of the present invention.

First, a configuration of a stroboscopic device in the exemplary embodiment is described with reference to FIGS. 1A and 1B and FIG. 2. FIG. 1A is a schematic side view of the stroboscopic device in the exemplary embodiment. FIG. 1B is a schematic sectional view of the stroboscopic device in the exemplary embodiment. FIG. 2 is a sectional view of a key part of the stroboscopic device in the exemplary embodiment of the present invention. In the exemplary embodiment, an irradiation angle ranges from 24 to 105 mm (converted based on 35 mm equivalent focal length). FIG. 2 shows the state that a distance between light controller member 5 and light emitter 4 is the longest, i.e., a telephoto end.

Stroboscopic device 1 includes light emitter 4 disposed in a casing configured with flash discharge tube 2 as a light source and reflector 3 (reflective member) for reflecting the light rays from flash discharge tube 2 in an irradiation direction, light controller member 5 disposed in an opening of the casing for controlling the light rays from light emitter 4, prism member 6 disposed near light emitter 4 at a position that does not cover an opening of reflector 3 for bending the light rays from flash discharge tube 2 in an optical axis direction, and a variable irradiation angle mechanism for changing an irradiation angle by varying the distance between light controller member 5 and flash discharge tube 2.

As shown in FIGS. 1A and 1B, light controller member 5 is fitted to the opening of the casing, which is to the side of an object. The casing includes light-emitter casing 7 for housing light emitter 4 having flash discharge tube 2 and reflector 3, and main body 8 disposed under light-emitter casing 7 for housing circuits and power source. The casing is attached to an imaging device by hot shoe (support) 9 provided at a lower part of main body 8.

Light emitter 4 may further include a front glass, which can transmit irradiated light rays from flash discharge tube 2, at the opening of reflector 3. This front glass is substantially closely-attached to the opening of reflector 3 so that no dust attaches to flash discharge tube 2. As a material of the front glass, fused quartz that is transparent and has high heat resistance is typically used. Light rays directly irradiated and the light rays reflected at reflector 3 and indirectly irradiated from flash discharge tube 2 to an open part pass through the front glass, and are irradiated outside of light emitter 4. The front glass is designed to endure the heat generated by the light rays even if it is disposed close to the front face of flash discharge tube 2.

Flash discharge tube 2 is a discharge tube in which rare gas (e.g., xenon) is sealed in a long glass bulb, and a voltage of about 300V is applied to main electrodes provided on both ends of the glass bulb. When voltage is applied to a trigger electrode, arc discharge is generated between both main electrodes in the glass bulb, and irradiation of the light rays starts.

A cross section of reflector 3 in a direction perpendicular to an axial core of flash discharge tube 2 is formed in a substantially parabolic shape (or substantially U-shape) to surround flash discharge tube 2. Reflector 3 is provided to reflect the light rays that are not irradiated toward light controller member 5 in a direction of light controller member 5 in the light rays radially emitted from a cylindrical light-emitting face of flash discharge tube 2. In reflector 3, both end faces of the axial core of flash discharge tube 2 are covered so that irradiated light rays of flash discharge tube 2 do not leak. The irradiated light rays from flash discharge tube 2 are thus irradiated only through the open part. Therefore, when reflector 3 is seen from the side of light controller member 5, its opening is a horizontally-rectangular figure. The main electrodes of flash discharge tube 2 are covered except for the outside of reflector 3. A lead wire for supplying power to flash discharge tube 2 is soldered and connected to the main electrodes on the outside of reflector 3.

Light controller member 5 is a Fresnel lens that has a light collecting and dispersion control effects on the surface and rear face, so as to collect irradiated light rays from flash discharge tube 2 and irradiated light rays reflected at reflector 3 and extend an outreach distance of irradiated light rays. This Fresnel lens is configured with a substantially transparent resin material such as acrylic resin and polycarbonate. A translucent protection member using a rigid material may be further provided on light controller member 5 at a position facing an opening formed in light-emitter casing 7, so as to protect light controller member 5 from external impact. Light controller member 5 is a substantially rectangular figure to match the shape of the opening, in order to fit into this substantially-rectangular opening formed in light-emitter casing 7.

Prism member 6 is disposed at a position that does not cover the opening (relative to light controller member 5) of reflector 3 in order not to block the light rays directly irradiated from flash discharge tube 2 and the light rays reflected at reflector 3. In other words, prism member 6 is disposed outside (to the side of an inner wall of light-emitter casing 7) of line A (an imaginary line) parallel to optical axis AXL of flash discharge tube 2 from open end c of reflector 3 (in a vertical direction). In this exemplary embodiment, open ends c of reflector 3 are, as shown in FIG. 2, equivalent to upper and lower sides of the opening that has a substantially-rectangular figure when seen from light controller member 5. In addition, stroboscopic device 1 in the exemplary embodiment is switchable to a telephoto mode by setting flash discharge tube 2 away from light controller member 5. Prism member 6 is disposed between line B (an imaginary line) connecting central axis O of flash discharge tube 2 and open end b of light controller member 5 and line C (an imaginary line) connecting central axis O of flash discharge tube 2 and open end c of reflector 3 at least in the telephoto mode. In this exemplary embodiment, open ends b of light controller member 5 are, as shown in FIG. 2, equivalent to upper and lower sides in a state that light controller member 5 is provided in light-emitter casing 7.

In this way, prism member 6 is disposed at a position that does not cover the opening of reflector 3, in order to guide light controller member 5 to the light rays irradiated between open ends b of light controller member 5 and open ends c of reflector 3, which are the light rays irradiated to the inner wall of light-emitter casing 7 and lost if prism member 6 is not used. Prism member 6 is thus disposed at a position where these light rays enter.

When a distance between light controller member 5 and central axis O of flash discharge tube 2 is the longest (the telephoto end in this exemplary embodiment), an angle between line B and line C becomes the largest. In this state, if prism member 6 is not provided, a quantity of the light rays irradiated toward the inner wall of light-emitter casing 7 and lost becomes the greatest. This is the state that an effect of prism member 6 of the present invention can be most expected.

In prism member 6, incoming face 10 where a part of the light rays from flash discharge tube 12 enters, total reflection face 11 for reflecting the light rays entering from incoming face 10, and outgoing face 12 for exiting the light rays reflected on total reflection face 11 are provided.

Incoming face 10 is formed substantially parallel to optical axis AXL of flash discharge tube 2. More specifically, a vertex between incoming face 10 and total reflection face 11 is located near open end c of reflector 3. A vertex between incoming face 10 and outgoing face 12 is located outside (to the side of the inner wall of light-emitter casing 7) of line B connecting central axis O of flash discharge tube 2 and open end b of light controller member 5.

Total reflection face 11 is formed such that it reflects the light rays entering from incoming face 10 parallel to optical axis AXL of flash discharge tube 2. More specifically, total reflection face 11 is formed in a flat or curved face that reflects the light rays entering through incoming face 10 in a direction substantially parallel to optical axis AXL.

Outgoing face 12 has a shape that exits the light rays reflected at total reflection face 11 such that they cross line B connecting central axis O of flash discharge tube 2 and open end b of light controller member 5. Outgoing face 12 is also formed in a flat or curved face that makes the light rays reflected at total reflection face 11 and become substantially parallel to optical axis AXL to cross line B.

Outgoing face 12 is formed such that it guides the light rays from total reflection face 11 to light controller member 5. More specifically, outgoing face 12 is formed such that an angle relative to an optical axis of the light rays directly entering around open end b of light controller member 5 and an angle relative to an optical axis of the light rays exiting from prism member 6 become similar so that exited light rays enter light controller member 5, with consideration to the light rays taking a large angle again relative to optical axis AXL of flash discharge tube 2 due to difference in refractive indexes of outgoing face 12 of prism member and air.

This enables the light rays to enter light controller member 5 at similar incoming angles and exit at similar outgoing angles, respectively. Light collected by light controller member 5 can thus be irradiated to an object as equivalent light rays.

To design prism member 6, an irradiation angle is set based on a distance between light controller member 5 and central axis O of flash discharge tube 2, a distance between central axis O of flash discharge tube 2 and the bottom of reflector 3, and a dimension of an opening of open end c between light controller member 5 and reflector 3, depending on required performance of each stroboscopic device 1. Then, lines B and lines C are set from these conditions, respectively.

Incoming face 10 is disposed near open end c of reflector 3 on a line substantially parallel to optical axis AXL of flash discharge tube 2 from positions of lines B and C in a state of the longest distance between light controller member 5 and central axis O of flash discharge tube 2 (the telephoto end in this exemplary embodiment). The length of incoming face 10 is up to a point of crossing line B.

Total reflection face 11 has any shape that can reflect the light rays from incoming face 10 in a direction substantially parallel to optical axis AXL. This is set based on the opening dimension of light controller member 5, length of incoming face 10, and an angle between line B and line C.

Outgoing face 12 can also have any shape that makes the light rays from total reflection face 11 cross line B to enter light controller member 5 for refraction.

The variable irradiation angle mechanism is configured such that it changes the irradiation angle by varying the distance between light controller member 5 and flash discharge tube 2. In the variable irradiation angle mechanism in the exemplary embodiment, a distance between light controller member 5 and light emitter 4 that is configured with reflector 3 and flash discharge tube 2 fixed on the bottom part of reflector 3 is changed to vary irradiation angle.

The irradiation angle becomes wider as the distance between light controller member 5 and light emitter 4 becomes shorter in the variable irradiation angle mechanism. The irradiation angle is at the wide-angle end when the distance is the shortest. When the distance is the longest, the irradiation angle is at the telephoto end. The variable irradiation angle mechanism in the exemplary embodiment thus switches to the telephoto mode by moving light emitter 4 away from light controller member 5, and switches to the wide-angle end by moving light emitter 4 closer to light controller member 5. The variable irradiation angle mechanism is configured to consecutively change a distance of prism member 6 to light controller member 5 and its positional relationship with reflector 3 in line with the movement of light emitter 4.

In this exemplary embodiment, the movement of prism member 6 is small relative to the movement of reflector 3. A vertex between incoming face 10 and outgoing face 12 of prism member 6 moves near line B, regardless of movement positions.

Figure 3A:
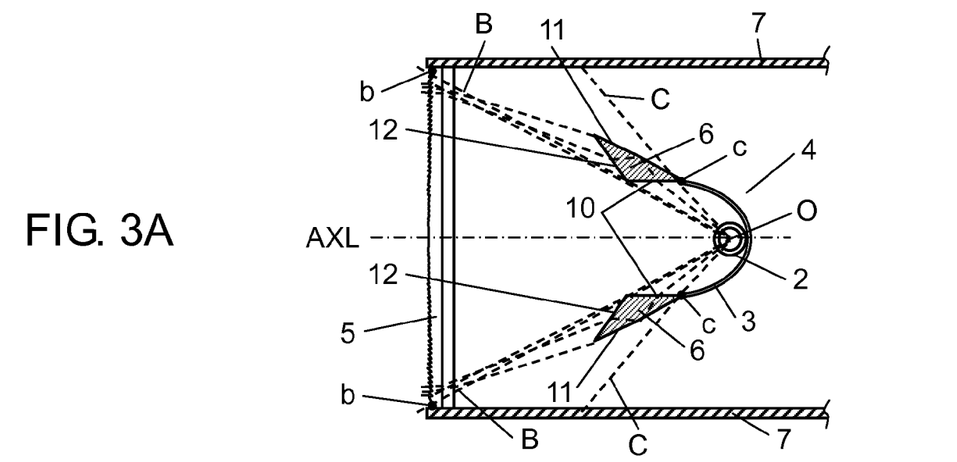
FIG. 3A is a sectional view of a key part illustrating a trace of irradiated light ray of the stroboscopic device at a telephoto end in accordance with the exemplary embodiment of the present invention.

Movement of the variable irradiation angle mechanism is detailed below with reference to FIGS. 3A, 3B, and 3C. FIG. 3A shows a trace of irradiated light rays when stroboscopic device 1 in the exemplary embodiment is set to the telephoto end (105 mm). FIG. 3 B shows a trace of irradiated light rays when stroboscopic device 1 in the exemplary embodiment is set to a middle range (50 mm, equivalent to vertical irradiation angle 34°). FIG. 3C shows a trace of irradiated light rays when stroboscopic device 1 in the exemplary embodiment is set to the wide-angle end (24 mm, equivalent to vertical irradiation angle 60°).

When stroboscopic device 1 is set to the telephoto end, the variable irradiation angle mechanism, as shown in FIG. 3A, moves light emitter 4 to the position where a distance with light controller member 5 becomes the longest. Prism member 6 is moved such that its entire incoming face 10 lies substantially parallel to optical axis AXL of flash discharge tube 2 at a position between line B and open end c of reflector 3.

Figure 3B:
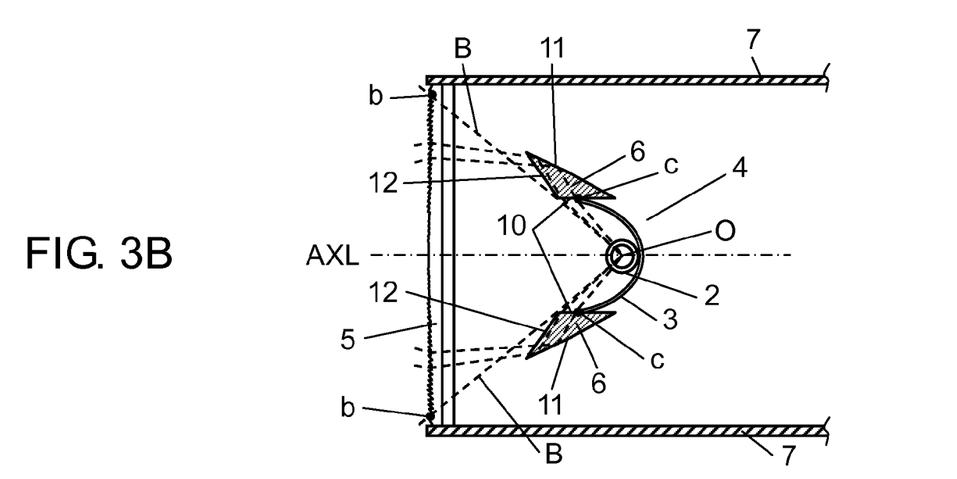
FIG. 3B is a sectional view of a key part illustrating a trace of irradiated light ray of the stroboscopic device at a middle range in accordance with the exemplary embodiment of the present invention.
Figure 3C:
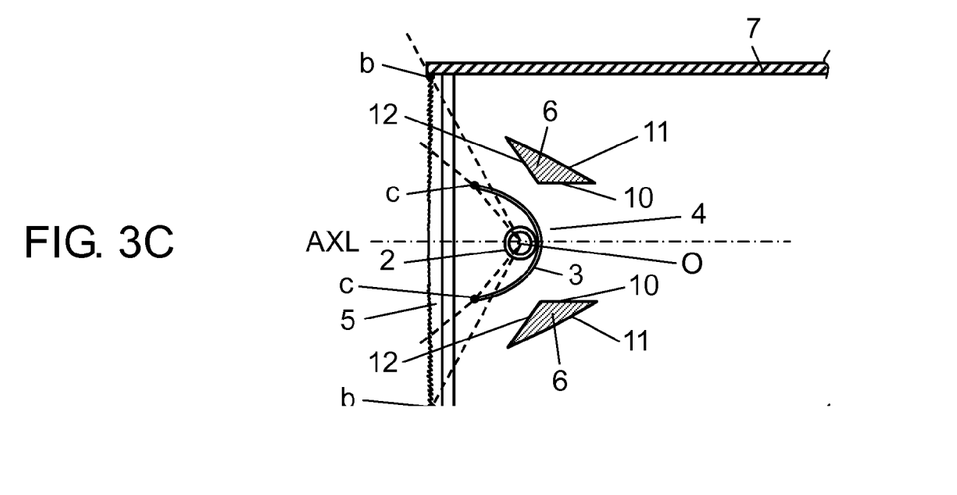
FIG. 3C is a sectional view of a key part illustrating a trace of irradiated light ray of the stroboscopic device at a wide-angle end in accordance with the exemplary embodiment of the present invention.

When stroboscopic device 1 is set to the middle range, the variable irradiation angle mechanism, as shown in FIG. 3B, moves light emitter 4 to the position where the distance with light controller member 5 is around the middle of a movable range of light emitter 4. In other words, light emitter 4 is moved to the position around the middle of the shortest and longest positions. Prism member 6 is moved such that its incoming face 10 is substantially parallel to optical axis AXL of flash discharge tube 2, and the vertex between incoming face 10 and outgoing face 12 of prism member 6 comes near line B.

When stroboscopic device 1 is set to the wide-angle end, the variable irradiation angle mechanism, as shown in FIG. 3C, moves light emitter 4 to the position where the distance with light controller member 5 becomes the shortest. Prism member 6 is moved such that its incoming face 10 is substantially parallel to optical axis AXL of flash discharge tube 2. Prism member 6 completely faces the rear face of reflector 3.

In this way, the variable irradiation angle mechanism sets a greater movement distance for light emitter 4 relative to a movement distance of prism member 6 at changing from the telephoto end to the middle range and wide-angle end. Incoming faces 10 are provided such that it moves substantially parallel to optical axis AXL of flash discharge tube 2 outside (to the inner wall of light-emitter casing 7) of lines A substantially parallel to optical axis AXL of flash discharge tube 2 from open ends c of reflector 3, respectively, so that light emitter 4 can pass between prism members 6 vertically disposed relative to light emitter 4.

This is the configuration of stroboscopic device 1 in the exemplary embodiment. Next is described an effect of stroboscopic device in the exemplary embodiment.

In the light rays irradiated from flash discharge tube 2, the light rays emitted within a range of irradiation angle D (see FIG. 2) between lines B and B connecting central axis O of flash discharge tube 2 and open ends b and b at the top and bottom of light controller member 5 are directly irradiated to an object without being reflected at reflector 3 (these irradiated light rays are hereinafter called "direct light"). In the light rays irradiated from flash discharge tube 2, the light rays irradiated out of the range of irradiation angle D but whose irradiation direction is corrected to come within the range of irradiation angle D by being reflected at an inner circumferential face of reflector 3 are also included in this direct light.

In the light rays irradiated from flash discharge tube 2, there are the light rays irradiated out of the range of irradiation angle D, reflected at an inner circumferential face of reflector 3, and irradiated in an irradiation direction out of the range of irradiation angle D. In addition, there are some light rays not irradiated toward light collector 5. These light rays are refracted and reflected at prism member 6 disposed between light collector 5 and light emitter 4 to correct their irradiation direction to within the range of irradiation angle D. Then, they are irradiated toward the object so as to complement the direct light (these irradiated light rays are hereinafter called "complementary light").

When stroboscopic device 1 is set to the telephoto end, the variable irradiation angle mechanism moves light emitter 4 to the position where the distance with light controller member 5 becomes the longest. Prism member 6 is moved between line B and reflector 3 in a state that its incoming face 10 is substantially parallel to optical axis AXL of flash discharge tube 2. In the light rays irradiated from flash discharge tube 2, the complementary light enters incoming face 10 of prism member 6 and is refracted outward (to the side of light-emitter casing 7) at a refractive angle based on a difference in refractive indexes of air and prism member 6. This complementary light entering total reflection face 11 is totally reflected in a substantially-parallel direction relative to optical axis AXL of flash discharge tube 2, and is refracted outward (to the side of light-emitter casing 7) on outgoing face 12 at a refractive angle based on a difference in refractive indexes of prism member 6 and air. Exited light rays cross line B at near open end b of light controller member 5, and complement light quantity of direct light irradiated from flash discharge tube 2. By the light-collecting effect of light controller member 5, the light rays are irradiated toward the object as the light rays substantially parallel to optical axis AXL again.

Accordingly, the light rays that have conventionally been lost can be emitted to light controller member 5, increasing the light quantity in the telephoto mode.

When stroboscopic device 1 is set to the middle range, the variable irradiation angle mechanism moves light emitter 4 to substantially the middle of the movable range of light emitter 4 in the distance with light controller member 5. In other words, light emitter 4 is moved to substantially the middle of a position at the shortest distance and a position at the longest distance. Prism member 6 is moved such that the vertex between its incoming face 10 and its outgoing face 12 comes near line B in a state that incoming face 10 is substantially parallel to optical axis AXL of flash discharge tube 2. At this point, incoming face 10 of prism member 6 is disposed partially facing the rear face of reflector 3. Since the distance between light controller member 5 and light emitter 4 becomes shorter, and an angle between line B connecting central axis O of flash discharge tube 2 and open end b of light controller member 5 and optical axis AXL becomes larger, the complementary light is reduced compared to that at the telephoto end.

In the light rays irradiated from flash discharge tube 2, the complementary light enters incoming face 10 of prism member 6, and is refracted outward (to the side of light-emitter casing 7) at a refractive angle based on a difference in refractive indexes of air and prism member 6. The complementary light entering total reflection face 11 is totally reflected slightly inward (to the side of optical axis AXL of light source) relative to optical axis AXL of light source. Then, the reflected complementary light is refracted slightly outward at outgoing face 12 at a refractive angle based on a difference in refractive indexes of prism member 6 and air, and irradiated from light controller member 5 toward the object at near light controller member 5 from the position of prism member 6 in a direction of optical axis AXL.

This enables the light rays that have conventionally been lost enter light controller member 5, increasing the light quantity in the middle range.

When stroboscopic device 1 is set at the wide-angle end, the variable irradiation angle mechanism moves light emitter 4 to the position where a distance with light controller member 5 is the shortest. Prism member 6 is disposed completely facing the rear face of reflector 3 in a state that its incoming face 10 is substantially parallel to optical axis AXL of light source.

Since the distance between light controller member 5 and light emitter 4 becomes the shortest, line B connecting central axis O of flash discharge tube 2 and open end b of light controller member 5 comes to the position back of line C connecting central axis O of flash discharge tube 2 and open end c of reflector 3. Substantially all of the light rays from flash discharge tube 2 thus become the direct light entering light controller member 5. Accordingly, the light rays irradiated from flash discharge tube 2 include no complementary light. All irradiated light rays are the direct light. Prism member 6 thus does not need to guide the light rays that will be lost to light controller member 5. Prism member 6 is disposed the back of open end c of reflector 3 so that prism member 6 does not interfere with the light rays entering light controller member 5 to avoid the light rays irradiated from flash discharge tube 2 from entering prism member 6.

With the above configuration, a dispersion effect of light controller member 5 will be increased in response to demands for wider irradiation angle. Even if the light-collecting performance reduces in the telephoto mode, prism member 6 can collect the light rays that are not directed toward light controller member 5 and lost. Accordingly, the exemplary embodiment offers stroboscopic device 1 that achieves both reduction of light loss and wider angle.

Figure 4A:
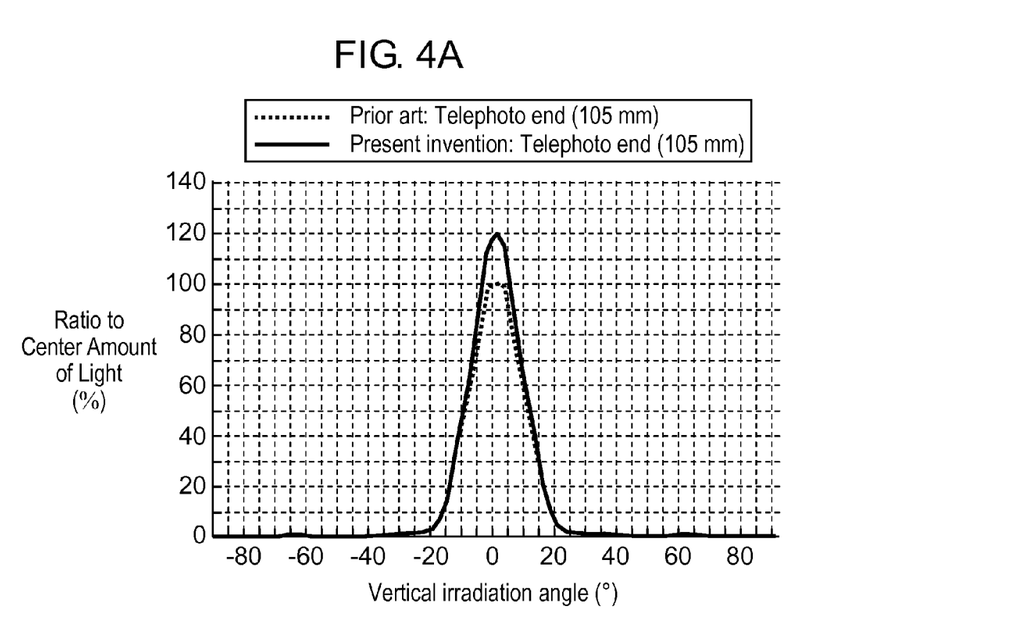
FIG. 4A is a graph comparing an amount of the light rays irradiated from a light controller member in the stroboscopic device in accordance with the exemplary embodiment of the present invention and that from a conventional stroboscopic device when each stroboscopic device is at the telephoto end.
Figure 4B:
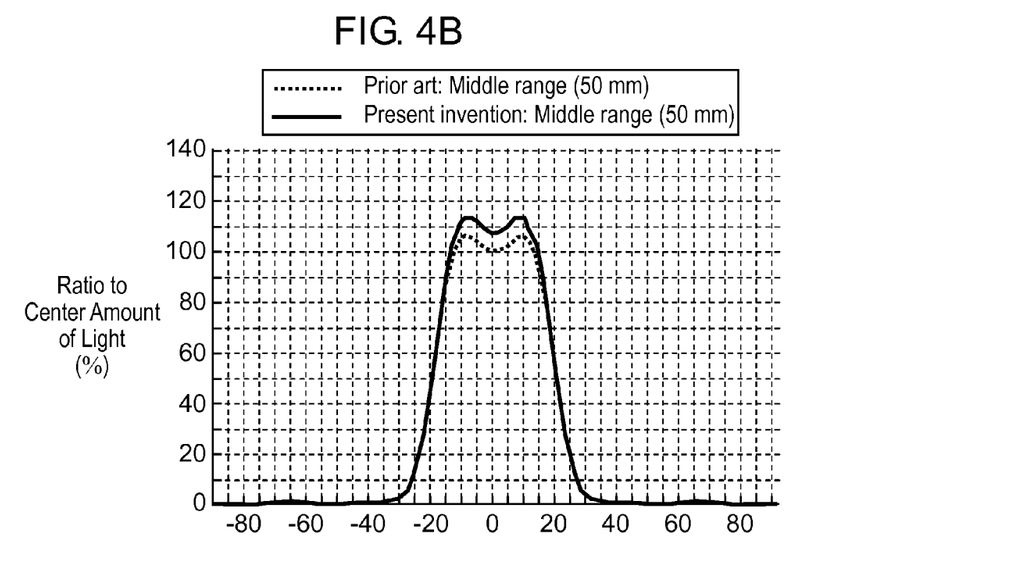
FIG. 4B is a graph comparing an amount of the light rays irradiated from the light controller member in the stroboscopic device in accordance with the exemplary embodiment of the present invention and that from the conventional stroboscopic device when the stroboscopic device is at the middle range.

Next, a difference in light quantity between stroboscopic device 1 in the exemplary embodiment and a conventional stroboscopic device is compared with reference to FIGS. 4A and 4B. FIG. 4A is a graph comparing light quantity at the telephoto end (105 mm) of stroboscopic device in the exemplary embodiment and that of the conventional stroboscopic device. FIG. 4B is a graph comparing light quantity in the middle range (50 mm) of stroboscopic device 1 in the exemplary embodiment and that of the conventional stroboscopic device.

First, when the stroboscopic device is set to the telephoto end, the light rays lost in the conventional stroboscopic device can be collected in the exemplary embodiment. Accordingly, as shown in FIG. 4A, light quantity is increased by about 20%, compared to that of the conventional stroboscopic device, at a center part of irradiation angle in the vertical direction (about 20°).

When the stroboscopic device is set to the middle range, the light rays lost in the conventional stroboscopic device can be collected in the exemplary embodiment. Accordingly, as shown in FIG. 4B, light quantity is increased by about 10%, compared to that of the conventional stroboscopic device, at a center part of irradiation angle in the vertical direction (about 34°).

When the stroboscopic device is set to the wide-angle end, no complementary light is generated in both the exemplary embodiment and the prior art. Dispersion is controlled only by light controller member 5, and thus the light quantity and distribution of light become the same in both devices.

In this way, stroboscopic device 1 in the above exemplary embodiment guides the path of the light rays irradiated to inside light-emitter casing 7, which is not directly irradiated or not directly irradiated via reflector 3 from flash discharge tube 2 to light controller member 5 (if not via prism member 6), to light controller member 5 by means of the refractive power of prism member 6. These guided light rays can thus be controlled to complement the light rays directly irradiated or directly irradiated via reflector 3 from flash discharge tube 2 to light controller member 5. Accordingly, the exemplary embodiment enables the use of the light rays normally irradiated to inside light-emitter casing 7 and not irradiated to light controller member 5. Light rays can be used highly efficiently, making a wider irradiation angle feasible.

When stroboscopic device 1 in the above exemplary embodiment switches to the telephoto mode by moving flash discharge tube 2 away from light controller member 5, the light rays that enter light controller member 5 via prism member 6 can be substantially limited to the next range. This range includes the light rays irradiated to the side of optical axis of flash discharge tube 2 from lines C connecting central axis O of flash discharge tube 2 and open ends c of reflector 3 (a range of the light rays irradiating from flash discharge tube 2) but excludes the light rays to the side of optical axis of flash discharge tube 2 from lines B connecting central axis O of flash discharge tube 2 and open ends b of light controller member 5 (a range of the light rays directly irradiated or directly irradiated via reflector 3 from flash discharge tube 2 to light controller member 5). In other words, only the light rays irradiated in a range between line B and line C pass prism member 6 and enter light controller member 5. This enables only the light rays other than those directly irradiated or directly irradiated via reflector 3 from flash discharge tube 2 to light controller member 5 to be guided to light controller member 5 by means of the refractive power of prism member 6. These guided light rays can be controlled to complement the light rays directly irradiated or directly irradiated via reflector 3 from flash discharge tube 2 to light controller member.

If the distance between flash discharge tube 2 and light controller member 5 is short, the irradiation angle is widened by light collection and dispersion control of light controller member 5. If the distance between flash discharge tube 2 and light controller member 5 is long, prism member 6 guides light controller member 5 to the light rays that are not directly irradiated to light controller member 5. This can reduce the loss of light quantity. The exemplary embodiment can also reduce the loss of light quantity due to repeated entering and exiting of irradiated light rays multiple times through prism member 6 and light controller member 5 with different refractive indexes.

In prism member 6 in the above exemplary embodiment, the light rays entering its incoming face 10 are refracted by a difference in refractive indexes of air and prism member 6 that has a larger refractive index than the air. After totally reflecting refracted light rays at total reflection face 11, these light rays are refracted again and exit at a smaller angle relative to the optical axis of flash discharge tube 2 than that at entering incoming face 10 by means of a difference in refractive index between prism member 6 and air. In this way, prism member 6 can guide the path of the light rays irradiated to inside light-emitter casing 7 without being directly irradiated or directly irradiated via reflector 3 (if not via prism member 6) from flash discharge tube 2 to light controller member 5.

Prism member 6 in the above exemplary embodiment refracts the light rays entering its incoming face 10 at an angle larger than the incoming angle relative to optical axis AXL of flash discharge tube 2 (in a direction away from optical axis AXL of flash discharge tube 2) by means of a difference in refractive indexes between air and prism member 6. By setting incoming face 10 of prism member 6 in this way, the light rays refracted at incoming face 10 can be totally reflected on total reflection face 11 in a direction substantially parallel to the optical axis of flash discharge tube without making an angle of total reflection face 11 relative to incoming face 10 large more than necessary. This prevents enlarging of prism member 6.

Prism member 6 in the above exemplary embodiment reflects the light rays refracted at incoming face 10 in a direction parallel to optical axis AXL of flash discharge tube 2. This makes the light rays refracted again at outgoing face 12 by means of a difference in refractive indexes between prism member 6 and air easier to be directed toward an opening of light-emitter casing 7.

Prism member 6 in the above exemplary embodiment can guide to light controller member 5 the path of the light rays irradiated to inside light-emitter casing 7 and not directly irradiated or directly irradiated via reflector 3 from flash discharge tube 2 (if not via prism member 6).

It is apparent that the stroboscopic device of the present invention is not limited to the above exemplary embodiment. The invention may be embodied in other forms without departing from the spirit thereof.

Figure 3D:
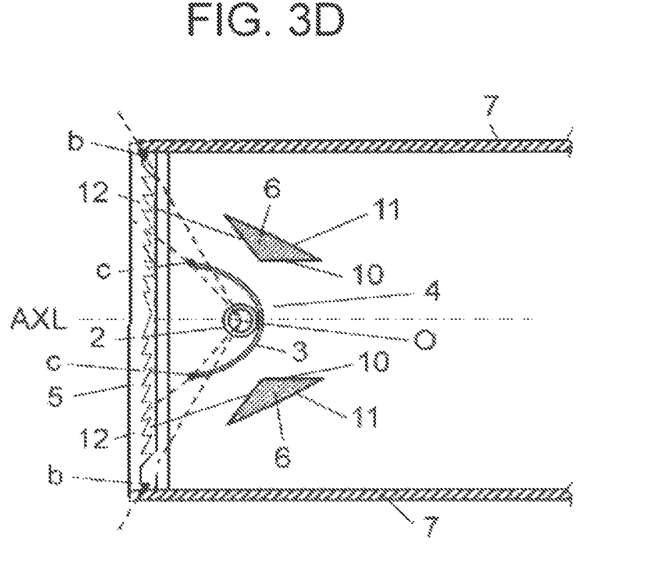
FIG. 3D is a sectional view of a key part of the stroboscopic device In accordance with a further exemplary embodiment of the present invention.

Stroboscopic device 1 in the above exemplary embodiment refers to an example of including the variable irradiation angle mechanism that is switchable to the telephoto mode by moving light emitter 4 away from light controller member 5. However the present invention is not limited to this mechanism. A stroboscopic device may be set to be switchable to the wide-angle mode by moving light emitter 4 away from light controller member 5. In this type of stroboscopic device, light controller member 5 is configured with a concave lens (concave Fresnel) whose concave face is disposed toward the light source. At least in the wide-angle mode, prism member 6 is preferably disposed between line B connecting central axis O of flash discharge tube 2 and open end b of light-emitter casing 7 and line C connecting central axis O of flash discharge tube 2 and open end c of reflector 3.

With this configuration, when stroboscopic device 1 in the above exemplary embodiment switches to the wide-angle mode by moving flash discharge tube 2 away from light controller member 5, the light rays that enter light controller member 5 via prism member 6 can be substantially limited to the next range. This range includes the light rays irradiated to the side of optical axis of flash discharge tube 2 from lines C connecting central axis O of flash discharge tube 2 and open ends c of reflector 3 (a range of the light rays irradiating from flash discharge tube 2) but excludes the light rays to the side of optical axis of flash discharge tube 2 from lines B connecting central axis O of flash discharge tube 2 and open ends b of light controller member 5 (a range of the light rays directly irradiated or directly irradiated via reflector 3 from flash discharge tube 2 to light controller member 5). This enables only the light rays other than those directly irradiated or directly irradiated via reflector 3 from discharge tube 2 to light controller member 5 to be guided to light controller member 5 by means of the refractive power of prism member 6. These guided light rays can be controlled to complement the light rays directly irradiated or directly irradiated via reflector 3 from flash discharge tube 2 to light controller member 5.

If the distance between flash discharge tube 2 and light controller member 5 is short, the irradiation angle is set to the telephoto mode by light collection and dispersion control of light controller member 5. If the distance between flash discharge tube 2 and light controller member 5 is long, prism member 6 guides light controller member 5 to the light rays that are not directly irradiated to light controller member 5. This can reduce the loss of light quantity. The exemplary embodiment can also reduce the loss of light quantity due to repeated entering and exiting of irradiated light rays multiple times through prism member 6 and light controller member 5 with different refractive indexes.

Stroboscopic device 1 in the above exemplary embodiment refers to an example of using flash discharge tube 2 as the light source. However, the present invention is not limited to this light source. The light source may be a point light source, such as light-emitting device (LED), in addition to a bar light source like flash discharge tube 2. The bar light source is a line light source using discharge between main electrodes. This is optically the same as an array of multiple point light sources. In this case, prism member 6 is disposed between line B connecting the center of light emitting devices relative to light controller member 5 and an end of light controller member 5 and line C connecting the center of light emitting devices and open end c of reflector 3 when the light emitting devices are aligned. Accordingly, the present invention also achieves the same effect when an array of multiple point light sources is used as the light source.

Still more, stroboscopic device 1 in the above exemplary embodiment refers to an example of using flash discharge tube 2 as a line light source for leading lines B and C. However, the present invention is not limited to this example. More specifically, to lead lines B and C in more detail, a flash discharge tube may be considered as a bar light source (plane light source), and a light-emitting element may be considered as a point light source, or a substantially spherical light source (plane light source), depending on the shape of light source. Even if the light source is not considered as a line light source, lines B and C can be led out, same as the case of line light source in the above exemplary embodiment, by considering point light sources as a group.

Stroboscopic device 1 in the above exemplary embodiment refers to refraction and light collection in a vertical irradiation angle. In this case, the present invention is not limited to this angle. A stroboscopic device may be used for horizontal refraction and light collection in line with arrangement of line light source and point light source. However, the irradiation angle can be changed as required in line with directions of refraction of irradiation angle and light collection, although ends of light controller member 5 are set as top and bottom sides and the opening of reflector 3 is set as top and bottom sides in the above exemplary embodiment to lead lines B and C.

Stroboscopic device 1 in the above exemplary embodiment refers to an example of changing the irradiation angle of irradiated light rays by controlling a distance between light emitter 4, in which a distance to flash discharge tube 2 and reflector 3 is fixed, and light controller member 5. However, the present invention is not limited to this example. A stroboscopic device may be configured to change the irradiation angle of irradiated light rays by varying the distance between the light controller member and the light source, and the distance between the light controller member and the reflector.

INDUSTRIAL APPLICABILITY

The stroboscopic device of the present invention has high light use efficiency. Accordingly the present invention is typically applicable to stroboscopic devices used as auxiliary light source for photographing that requires a wider irradiation angle.

REFERENCE MARKS IN THE DRAWINGS

1 Stroboscopic device
2 Flash discharge tube (light source)
3 Reflector (reflective member)
4 Light emitter 5 Light controller member
6 Prism member
7 Light-emitter casing (casing)
10 Incoming face
11 Total reflection face
12 Outgoing face
B Line (connecting the central axis of light source and the end of light controller member)
C Line (connecting the central axis of light source and the open end of reflector)

What we claim is:

1. A stroboscopic device comprising:
a light emitter disposed in a casing, the light emitter including a light source and a reflector for reflecting a light ray from the light source in an irradiation direction; and
a light controller disposed in an opening of the casing, the light controller controlling the light ray from the light emitter, and
the stroboscopic device adapted for changing an irradiation angle by varying a distance between the light controller and the light source,
wherein
a plurality of prisms that do not cover an opening of the reflector, the prisms bending the light ray from the light source into an optical axis direction,
the prisms move between a first position at the a front of the reflector to a second position at a back of the reflector,
the stroboscopic device is switches to a telephoto mode by moving the light source away from the light controller, at least one of the prisms being disposed, at least in the telephoto mode, between a line connecting the light source and an end of the light controller and a line connecting a central axis of the light source and an open end of the reflector, the at least one of the prisms and the light controller controlling the light ray from the light source, and
the stroboscopic device is switches to a wide-angle mode by moving the light source close to the light controller, the prisms being moved, at least in the wide-angle mode, to the back of the reflector, only the light controller controlling the light ray from the light source.

2. The stroboscopic device of claim 1
wherein the prism includes an incoming face where a part of the light ray from the light source enters, a total reflection face for reflecting the light ray entering from the incoming face, and an outgoing face where the light ray reflected at the total reflection face exits.

3. The stroboscopic device of claim 2,
wherein when the light source is moved away from the light controller, a vertex between the incoming face and the total reflection face of the prism is positioned near the open end of the reflector, and a vertex between the incoming face and the outgoing face is positioned outside a line connecting the central axis of the light source and the open end of the light controller.

4. The stroboscopic device of claim 2,
wherein the total reflection face reflects the light ray entering from the incoming face to a direction along an optical axis of the light source.

5. The stroboscopic device of claim 2,
wherein the outgoing face has a shape for exiting the light ray reflected at the total reflection face such that the light ray crosses a line connecting the light source and the end of the light controller.

6. The stroboscopic device of claim 1, wherein
the light source includes a cylindrical light-emitting face,
the reflector has a substantially parabolic cross-sectional shape in a direction perpendicular to an axial core of the light source,
the reflector surrounds the light source, and
a distance between the light controller and the end of the reflector is smaller than a distance between the light controller and the cylindrical light-emitting face.

7. A stroboscopic device comprising:
a light emitter disposed in a casing, the light emitter including a light source and a reflector for reflecting a light ray from the light source in an irradiation direction; and
a light controller disposed in an opening of the casing, the light controller controlling the light ray from the light emitter, and
the stroboscopic device adapted for changing an irradiation angle by varying a distance between the light controller and the light source,
wherein
a prism is disposed near the light emitter at a position that does not cover an opening of the reflector, the prism bending the light ray from the light source into an optical axis direction,
the stroboscopic device is switches to a wide-angle mode by moving the light source away from the light controller, the prism being disposed, at least in the wide-angle mode, between a line connecting the light source and an end of the light controller and a line connecting a central axis of the light source and an open end of the reflector, the prism and the light controller controlling the light ray from the light source, and
the stroboscopic device is switches to a telephoto mode by moving the light source close to the light controller, the prism being moved, at least in the telephoto mode, to a back of the reflector, only the light controller controlling the light ray from the light source.

8. The stroboscopic device of claim 7,
wherein the prism includes an incoming face where a part of the light ray from the light source enters, a total reflection face for reflecting the light ray entering from the incoming face, and an outgoing face where the light ray reflected at the total reflection face exits.

9. The stroboscopic device of claim 8,
wherein when the light source is moved away from the light controller, a vertex between the incoming face and the total reflection face of the prism is positioned near the open end of the reflector, and a vertex between the incoming face and the outgoing face is positioned outside a line connecting the central axis of the light source and the open end of the light controller.

10. The stroboscopic device of claim 8,
wherein the total reflection face reflects the light ray entering from the incoming face to a direction along an optical axis of the light source.

11. The stroboscopic device of claim 8,
wherein the outgoing face has a shape for exiting the light ray reflected at the total reflection face such that the light ray crosses a line connecting the light source and the end of the light controller.

12. The stroboscopic device of claim 7, wherein
the light source includes a cylindrical light-emitting face,
the reflector has a substantially parabolic cross-sectional shape in a direction perpendicular to an axial core of the light source,
the reflector surrounds the light source, and a distance between the light controller and the end of the reflector is smaller than a distance between the light controller and the cylindrical light-emitting face.

* * * * *